Patented Sept. 23, 1930

1,776,667

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK, GESELLSCHAFT MIT BESCHRANKTER HAFTUNG, OF DUSSELDORF-OBERKASSEL, GERMANY

PROCESS FOR MAKING INACTIVE MENTHOL

No Drawing. Original application filed June 30, 1927, Serial No. 202,739, and in Germany February 15, 1927. Divided and this application filed September 20, 1928. Serial No. 307,331.

This is a process for the production of inactive menthol, new isomer of inactive menthol and making the same, being a divisional application of application Serial No. 202,739 filed June 30th, 1927.

This process for the production of inactive menthol, the racemate of natural menthol consists in subjecting inactive neomenthol (melting point 51° C.) (acid-phthalate melting point 177° C.) to a transformation through catalysts with hydrogenation catalyzers with heat and in the presence of hydrogen with or without pressure, by which isomers are produced, and the mixture of menthol thus produced is treated through refrigeration or fractional distillation thus getting a fixed inactive menthol which may be purified by the method described in U. S. Patent No. 1,672,346 of June 5, 1928.

The isomerization can be carried out so that inactive neo-menthol can be taken and is subjected to catalysts together with neo-isomenthol. It is possible to treat inactive neomenthol or a mixture of inactive neo-menthol and inactive neo-isomenthol together with inactive isomenthol of a melting point of 53° C. Also one can use neomenthol alone in the mixture with neo-isomenthol or with isomenthol, melting point 53° C., or all three together with thymol, menthone and isomenthone or two of these bodies or all three together being subjected to the influence of hydrogen in the presence of catalyzers. The isomerization of the inactive neomenthol has never hitherto been described. In Patent No. 1,625,771 there is a description of the use of a fluid menthols mixture with hydrogen catalyzers.

These liquid menthols mixtures have a considerable portion of inactive menthol used as ballast. The treatment of isolated neomenthol which is kept in a greater quantity with the separation of menthol from the hydrogenated mass as well as the treatment of neomenthol with the other isomers has the advantage that the isomerization occurs with the theoretical masses of the material used. That only the isomers are affected by the catalyst is seen. This results in considerable savings in catalysts, in reaction room, heating material etc.

The foregoing process therefore has a considerable advantage over the former processes. Further according to the foregoing application inactive neomenthol of any origin can be subjected to the isomerization process. Useful catalyzers for hydrogenation as well as isomerization are nickel, cobalt, copper platinum, palladium or mixtures of these metals in powered form or distributed on carriers such as kieselguhr, asbestos, pumicestone, barium-sulphate and similar materials. In place of the metals the oxygen compounds or the easily broken-up organic salts such as the carbonates and formates, may be used. The raw inactive menthol which is obtained according to the preceding can be purified for example by converting it into the ester of the paranitrobenzoic acid, carbonate, borate, acid-phthalate or succinate and then the pure crystallized esters or acid esters are saponified.

*Example 1.*—300 kilograms of inactive neomenthol are treated with 6 kilograms of nickel catalyst, at a pressure of about 10–30 atmospheres of hydrogen at 180 degrees centigrade with agitation, until the condition of equilibrium of the transformation, that is, a maximum of inactive menthol, is attained (period about 24 hours). The crude inactive menthol is separated from the mixture of the isomers by freezing or fractional distillation or both and is further purified by way of the crystallized esters. Completely pure inactive menthol of melting point 34–36 degrees centigrade is obtained. The isomeric menthols resulting from the separation and purification of the inactive menthol are transformed afresh.

*Example 2.*—100 kilograms of inactive neomenthol, admixed with 200 kilograms of thymol or inactive menthone or isomenthone are hydrogenated with 6 kilograms of nickel catalyst at 180 degrees centigrade and under 10–30 atmospheres of hydrogen and at the same time transformed as in Example 1, and the resulting crude inactive menthol separated and purified as therein.

*Example 3.*—A mixture of 100 kilograms of inactive neomenthol, melting point 51 degrees centigrade, 100 kilograms of inactive neo-isomenthol, melting point 12-14 degrees centigrade, 100 kilograms of inactive isomenthol, melting point 53 degrees centigrade, is treated as in Example 1 with 9 kilograms of nickel catalyst at 180 degrees centigrade and under 10-30 atmospheres of hydrogen, and the resulting crude inactive menthol is separated and purified as therein.

We claim:

1. The process for manufacturing inactive menthol, the racemate of natural menthol, which consists in heating inactive neomenthol with hydrogenating catalysts and hydrogen under agitation and separating from the reaction product the obtained crude inactive menthol.

2. The process for manufacturing inactive menthol, the racemate of natural menthol, which consists in heating inactive neomenthol with hydrogenating catalysts and hydrogen under pressure and agitation and separating from the reaction product the obtained crude inactive menthol.

3. The process for manufacturing inactive menthol, the racemate of natural menthol, which consists in heating inactive neomenthol admixed with materials which are capable of being hydrogenated to inactive menthols mixtures with hydrogenating catalysts and hydrogen under pressure and agitation and separating from the reaction product the obtained crude inactive menthol.

4. The process for manufacturing inactive menthol, the racemate of natural menthol, which consists in heating inactive neomenthol admixed with other isomers of inactive menthol with hydrogenating catalysts and hydrogen under agitation and separating from the reaction product the obtained crude inactive menthol.

5. The process for manufacturing inactive menthol, the racemate of natural menthol, which consists in heating inactive neomenthol with hydrogenating catalysts and hydrogen under agitation and separating from the reaction product crude inactive menthol by physical methods.

6. The process for manufacturing inactive menthol, the racemate of natural menthol, which consists in heating inactive neomenthol with hydrogenating catalysts and hydrogen under agitation and separating from the reaction product crude inactive menthol by fractional distillation.

7. The process for manufacturing inactive menthol, the racemate of natural menthol, which consists in heating inactive neomenthol with hydrogenating catalysts and hydrogen under pressure and agitation and separating from the reaction product crude inactive menthol by physical methods.

8. The process for manufacturing inactive menthol, the racemate of natural menthol, which consists in heating inactive neomenthol with hydrogenating catalysts and hydrogen under pressure and agitation and separating from the reaction product crude inactive menthol by fractional distillation.

9. The process for manufacturing inactive menthol the racemate of natural menthol, which consists in heating inactive neomenthol mixed with materials which are capable of being hydrogenated to inactive menthol mixtures with hydrogenating catalysts and hydrogen under pressure and agitation and separating from the reaction product crude inactive menthol by physical methods.

10. The process for manufacturing inactive menthol the racemate of natural menthol, which consists in heating inactive neomenthol mixed with materials which are capable of being hydrogenated to inactive menthol mixtures with hydrogenating catalysts and hydrogen under pressure and agitation and separating from the reaction product crude inactive menthol by fractional distillation.

11. The process for manufacturing inactive menthol, the racemate of natural menthol, which consists in heating inactive neomenthol mixed with other isomers of inactive menthol with hydrogenating catalysts and hydrogen under agitation and separating from the reaction product crude inactive menthol by physical methods.

12. The process for manufacturing inactive menthol, the racemate of natural menthol, which consists in heating inactive neomenthol mixed with other isomers of inactive menthol with hydrogenating catalysts and hydrogen under agitation and separating from the reaction product crude inactive menthol by fractional distillation.

13. The process for manufacturing inactive menthol, the racemate of natural menthol, which consists in heating inactive neomenthol with hydrogenating catalysts and hydrogen under agitation and separating from the reaction product crude inactive menthol by fractional crystallization.

14. The process for manufacturing inactive menthol, the racemate of natural menthol, which consists in heating inactive neomenthol with hydrogenating catalysts and hydrogen under pressure and agitation and separating from the reaction product crude inactive menthol by fractional crystallization.

15. The process for manufacturing inactive menthol, the racemate of natural menthol, which consists in heating inactive neomenthol mixed with materials which are capable of being hydrogenated to inactive menthol mixtures with hydrogenating catalysts and hydrogen under pressure and agitation and separating from the reaction product crude inactive menthol by fractional crystallization.

16. The process for manufacturing inactive menthol, the racemate of natural menthol, which consists in heating inactive neomenthol mixed with other isomers of inactive menthol with hydrogenating catalysts and hydrogen under agitation and separating from the reaction product crude inactive menthol by fractional crystallization.

In testimony whereof we affix our signatures.

KARL SCHÖLLKOPF.
ARTHUR SERINI.